(12) United States Patent
Sato

(10) Patent No.: US 11,802,621 B2
(45) Date of Patent: Oct. 31, 2023

(54) METAL GASKET

(71) Applicant: VALQUA, LTD., Tokyo (JP)

(72) Inventor: Koji Sato, Gojo (JP)

(73) Assignee: VALQUA, LTD., Tokyo (JP)

( * ) Notice: Subject to any disclaimer, the term of this patent is extended or adjusted under 35 U.S.C. 154(b) by 214 days.

(21) Appl. No.: 16/635,013

(22) PCT Filed: Jul. 11, 2018

(86) PCT No.: PCT/JP2018/026131
§ 371 (c)(1),
(2) Date: Jan. 29, 2020

(87) PCT Pub. No.: WO2019/026570
PCT Pub. Date: Feb. 7, 2019

(65) Prior Publication Data
US 2020/0240519 A1 Jul. 30, 2020

(30) Foreign Application Priority Data

Aug. 2, 2017 (JP) ................................. 2017-150150
Mar. 30, 2018 (JP) ................................. 2018-066626

(51) Int. Cl.
*F16J 15/08* (2006.01)
(52) U.S. Cl.
CPC ................................ *F16J 15/0818* (2013.01)
(58) Field of Classification Search
CPC .................................................... F16J 15/0818
See application file for complete search history.

(56) References Cited

U.S. PATENT DOCUMENTS 4,477,087 A * 10/1984 Sutter, Jr. ............. F16J 15/0887
277/644
6,042,121 A * 3/2000 Ma ....................... F16J 15/0887
277/608

(Continued)

FOREIGN PATENT DOCUMENTS

EP 0711938 A1 5/1996
GB 1527344 A 10/1978

(Continued)

OTHER PUBLICATIONS

International Search Report dated Sep. 4, 2018, issued in counterpart International Application No. PCT/JP2018/026131. (1 page).

(Continued)

*Primary Examiner* — Eugene G Byrd
(74) *Attorney, Agent, or Firm* — XSENSUS LLP

(57) ABSTRACT

Provided is a metal gasket, which is used for connecting pipes to each other in a thermal power plant, a nuclear power plant, a steam engine in a steam turbine ship, an oil refinery line, a petrochemical industry process line, a semiconductor manufacturing line or the like, and which is characterized in that a V-shaped circumferential groove 2 is provided on the outer circumferential surface of the metal gasket 1, the ratio (circumferential groove depth A/horizontal length B) of the depth A of the circumferential groove 2 and the horizontal length B in a cross section of the metal gasket 1 is 0.1 to 0.95, and the notch angle of the V-shaped circumferential groove 2 is 30° to 120°.

3 Claims, 6 Drawing Sheets

(56) References Cited

U.S. PATENT DOCUMENTS

| | | | |
|---|---|---|---|
| 6,409,180 B1* | 6/2002 | Spence | F16J 15/0881 |
| | | | 277/608 |
| 6,905,125 B2* | 6/2005 | Shibata | F16J 15/0881 |
| | | | 277/606 |
| 6,945,539 B2* | 9/2005 | Whitlow | F16J 15/0887 |
| | | | 277/616 |
| 8,505,983 B2 | 8/2013 | Hiss | |
| 9,151,387 B2* | 10/2015 | Datta | F16J 15/0887 |
| 2014/0225367 A1* | 8/2014 | Vu | F16J 15/122 |
| | | | 285/345 |
| 2016/0040783 A1* | 2/2016 | Kullen | F01N 13/08 |
| | | | 277/608 |
| 2019/0078687 A1* | 3/2019 | Takeuchi | F16L 23/024 |

FOREIGN PATENT DOCUMENTS

| | | | |
|---|---|---|---|
| JP | 60-43766 U | | 3/1985 |
| JP | 9-177976 A | | 7/1997 |
| JP | 11-30333 A | | 2/1999 |
| JP | 11-118036 A | | 4/1999 |
| JP | 2002-235854 A | | 8/2002 |
| JP | 2003-156147 A | | 5/2003 |
| JP | 2003156147 A | * | 5/2003 |

OTHER PUBLICATIONS

Extended European Search Report dated Mar. 12, 2021, issued in counterpart European Application No. 18841791.9 (in English; 7 pages).

* cited by examiner

[Fig. 5]
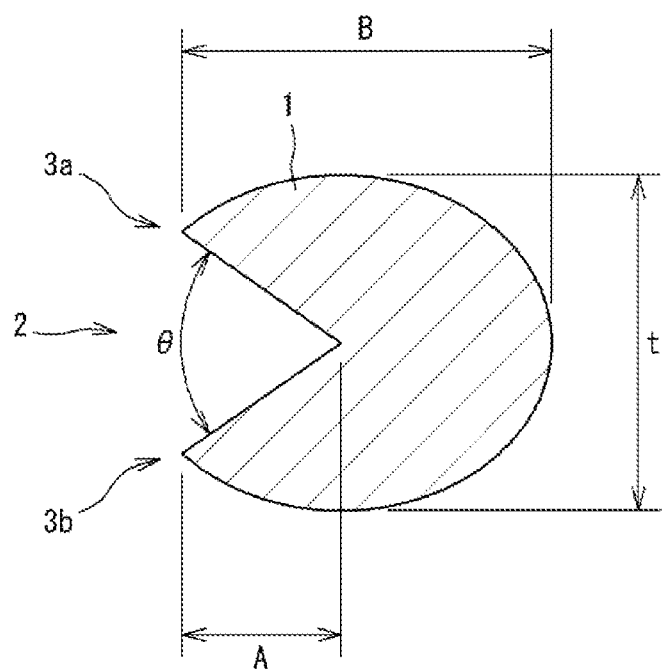

[Fig. 6]
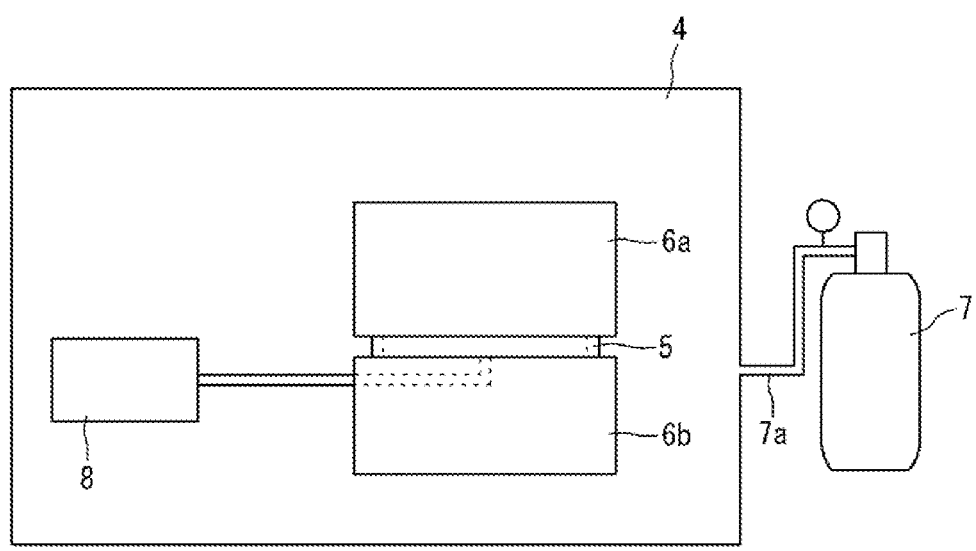

METAL GASKET

TECHNICAL FIELD

The present invention relates to a metal gasket. More specifically, the present invention relate to a metal gasket which is used for connecting pipes to each other, for example, in a thermal electric power plant, a nuclear power plant, a steam engine of a steam turbine ship, a petroleum refining line, a petrochemical industry process line, a semiconductor manufacturing line and the like.

BACKGROUND ART

As a metal gasket which is excellent in heat resistance and which can be fastened with a reduced force, a metal hole O-ring gasket and a metal C-ring gasket have been proposed (for example, see Patent Literature 1 and Patent Literature 2). As a metal gasket which can be fastened with a force smaller than these metal gaskets and which is excellent in sealing property, a metal ring gasket having a V-shaped circumferential groove on its inner circumferential surface having a ring shape, and a metal gasket provided with a recessed groove on its outer circumferential surface or its inner circumferential surface have been proposed (for example, see Patent Literature 3 and Patent Literature 4).

The above-mentioned metal ring gasket and the above-mentioned metal gasket can be fastened with a reduced force, and are excellent in sealing property.

However, in recent years, it has been desired to develop a metal gasket capable of securing sealing performance by fastening flanges to each other with a small fastening force.

PRIOR ART LITERATURES

Patent Literatures

Patent Literature 1: Japanese Patent Unexamined Publication No. H9-177976

Patent Literature 2: Japanese Patent Unexamined Publication No. H11-30333

Patent Literature 3: Japanese Utility Model Publication No. S60-43766

Patent Literature 4: Japanese Patent Unexamined Publication No. 2003-156147

SUMMARY OF THE INVENTION

Problems to be Solved by the Invention

The present invention has been made in view of the above-mentioned prior art. An object of the present invention is to provide a metal gasket capable of securing sealing performance by fastening flanges to each other with a small fastening force.

Means for Solving the Problems

The present invention relates to:
(1) a metal gasket having a V-shaped circumferential groove on an outer peripheral surface of the metal gasket, wherein a value of a ratio of a depth A of the circumferential groove to a length B of the metal gasket in horizontal direction in a cross section of the metal gasket (depth A of the circumferential groove/length B in horizontal direction) is 0.1 to 0.95, and a notch angle of the V-shaped circumferential groove is 30° to 120°;

(2) the metal gasket according to the above-mentioned item (1), wherein a surface hardness of the metal gasket is 15 to 250 HV; and (3) the metal gasket according to the above-mentioned item (1) or (2), wherein the metal gasket is formed of a metal selected from the group consisting of aluminum, aluminum alloy, stainless steel, inconel, carbon steel, lead, gold, silver, copper and magnesium alloy.

Effects of the Invention

According to the present invention, a metal gasket capable of securing sealing performance by fastening flanges to each other with a small fastening force is provided.

BRIEF DESCRIPTION OF THE DRAWINGS

FIG. 5 is a schematic explanatory drawing showing a depth A of a V-shaped circumferential groove of the metal gasket and a length B in horizontal direction of the metal gasket according to the present invention.

FIG. 6 is a schematic explanatory drawing of a testing device for evaluating sealing property of a gasket used in each of working examples and each of comparative examples.

MODE FOR CARRYING OUT THE INVENTION

Figure 1:
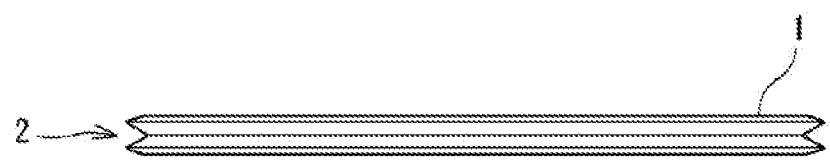
FIG. 1(a) is a schematic side view showing one embodiment of a metal gasket according to the present invention.
FIG. 1(b) is a schematic plan view showing one embodiment of the metal gasket.
Figure 1:
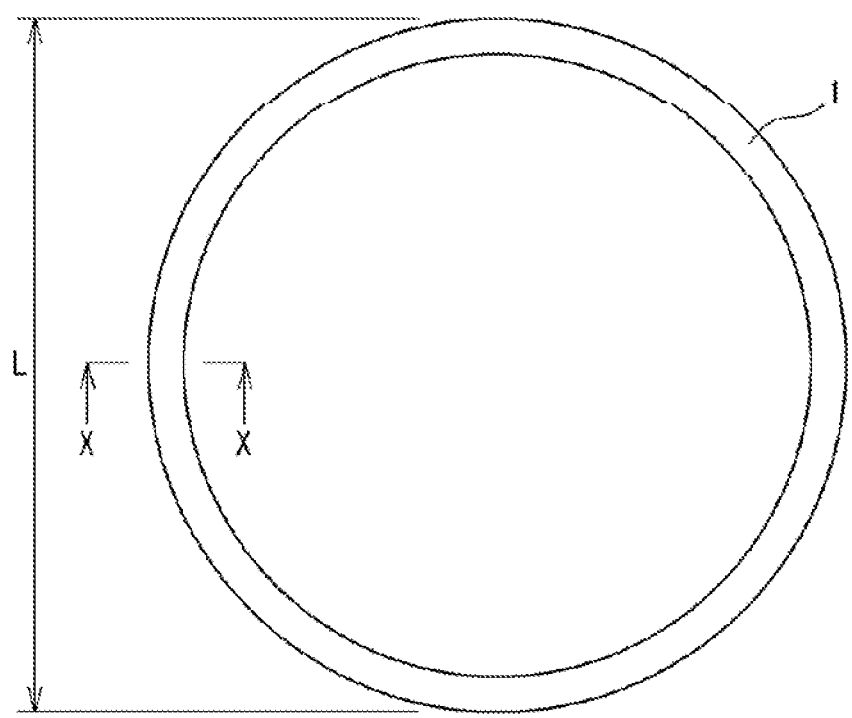

As described above, the metal gasket according to the present invention is characterized in that the metal gasket has a V-shaped circumferential groove on an outer peripheral surface of the metal gasket, that a value of a ratio of a depth A of the circumferential groove to a length B of the metal gasket in horizontal direction in a cross section of the metal gasket (depth A of the circumferential groove/length B in horizontal direction) is 0.1 to 0.95, and that a notch angle of the V-shaped circumferential groove is 30° to 120°. Since the metal gasket according to the present invention has the above-mentioned configuration, the metal gasket exhibits excellent effects such as securing of sealing performance by fastening flanges to each other with a small fastening force.

The metal gasket according to the present invention will be more specifically described below with reference to drawings. However, the present invention is not limited to only embodiments illustrated in the drawings.

FIG. 1(a) is a schematic side view showing one embodiment of the metal gasket according to the present invention, and FIG. 1(b) is a schematic plan view of the metal gasket.

In FIG. 1, a lower limit of a surface hardness (Vickers hardness) of the metal gasket 1 according to the present invention is preferably 15 HV or more, and more preferably 19 HV or more, from the viewpoint of securing of sealing performance by fastening flanges to each other with a small fastening force. An upper limit of the surface hardness (Vickers hardness) of the metal gasket 1 according to the present invention is preferably 250 HV or less, more preferably 220 HV or less, furthermore preferably 175 HV or less, still furthermore preferably 170 HV or less, from the viewpoint of securing of sealing performance by fastening flanges to each other with a small fastening force.

In the metal gasket 1 according to the present invention, a material of the metal gasket is preferably a metal selected from the group consisting of aluminum, aluminum alloy, stainless steel, inconel, carbon steel, lead, gold, silver, copper and magnesium alloy, more preferably a metal selected from the group consisting of aluminum, aluminum alloy, stainless steel and inconel, and furthermore preferably aluminum or stainless steel, from the viewpoint of securing of sealing performance by fastening flanges to each other with a small fastening force The aluminum alloy includes, for example, aluminum-iron alloy, aluminum-copper alloy, aluminum-manganese alloy, aluminum-magnesium alloy, aluminum-zinc alloy, aluminum-nickel alloy and the like, and the present invention is not limited only to those exemplified ones.

The stainless steel includes, for example, SUS304, SUS430, SUS630, SUS631, SUS633, SUS420J2 and the like, and the present invention is not limited only to those exemplified ones.

A metal other than magnesium which is used in the magnesium alloy includes, for example, lithium, calcium, aluminum, zinc, titanium, manganese, zirconium, yttrium, tantalum, neodymium, niobium and the like, and the present invention is not limited only to those exemplified ones.

The plane shape of the metal gasket 1 is annular as shown in FIG. 1(b). An outer diameter L of the metal gasket 1 in the plane shape cannot be absolutely determined because the outer diameter L differs depending on uses of the metal gasket 1. Accordingly, it is preferred that the outer diameter L is appropriately determined in accordance with the uses of the metal gasket 1, and is usually 2 mm to 3 m or so.

The cross sectional shape of the metal gasket 1 in the X-X section shown in FIG. 1(b) can be a circular shape as shown in FIG. 2(a), a rectangular shape as shown in FIG. 2(b), or a polygonal shape such as a square shape or an oblong shape as shown in FIG. 2(c). The above-mentioned circular shape includes not only a perfect circle shape but also an oblong oval shape and a horizontally long oval shape. Incidentally, each of FIGS. 2(a) to 2(c) is a schematic cross-sectional view showing one embodiment of the metal gasket according to the present invention, respectively.

Figure 3:
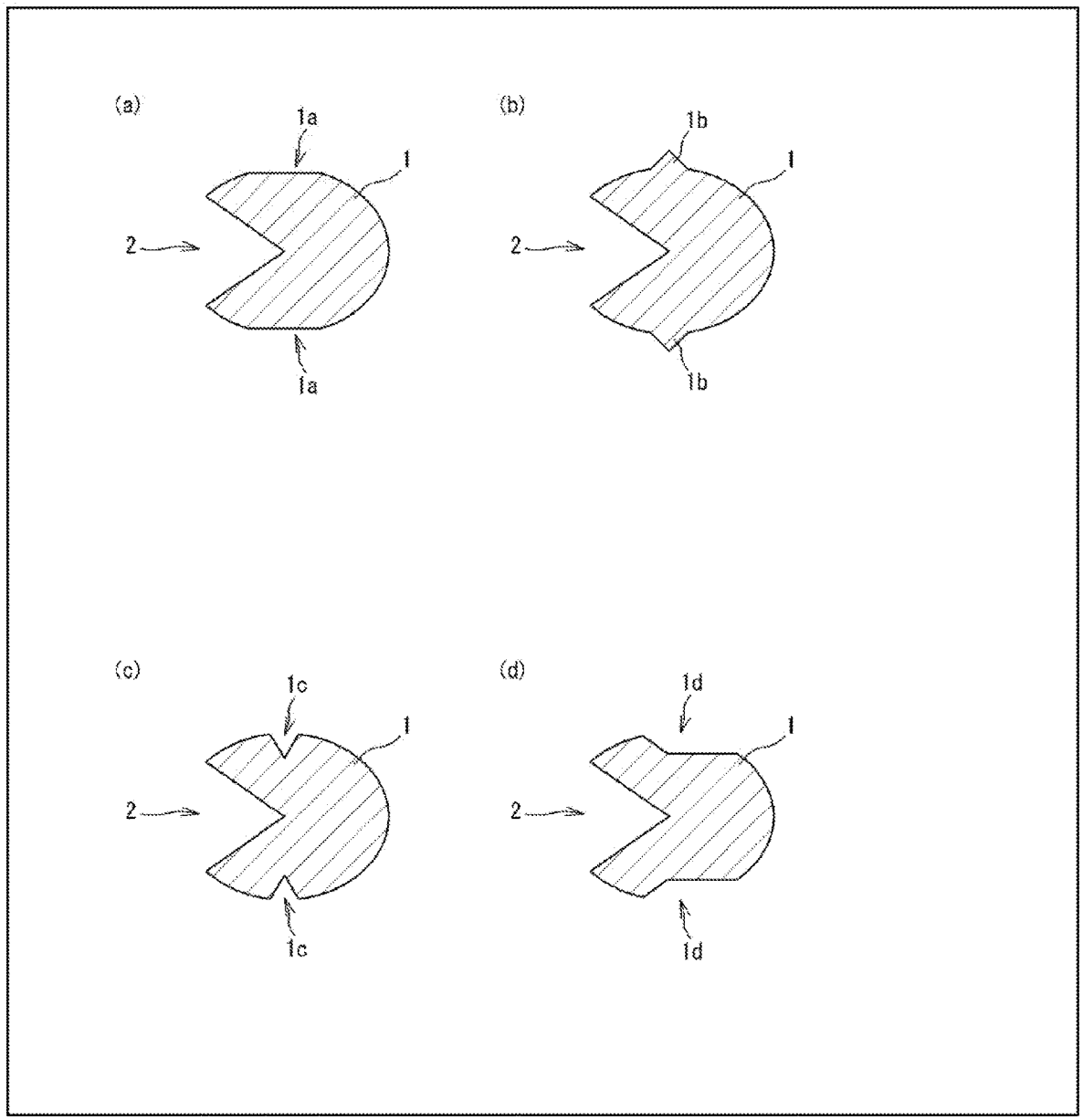
FIG. 3 is a schematic cross-sectional view showing another embodiment of the metal gasket in the X-X section shown in FIG. 1(b).

A planar section 1a as shown in FIG. 3(a), a convex part (projection) 1b as shown in FIG. 3(b), a recessed part 1c as shown in FIG. 3(c) or a notch 1d as shown in FIG. 3(d) can be formed on the upper surface or the undersurface of the metal gasket 1. The planar section 1a, the convex part 1b, the recessed part 1c and the notch 1d can be formed on both surfaces of the upper surface and the undersurface, only on the upper surface, or only on the undersurface, respectively. Incidentally, each of FIGS. 3(a) to 3(d) is a schematic cross-sectional view showing another embodiment of the metal gasket in the X-X section shown in FIG. 1(b), respectively.

Figure 4:
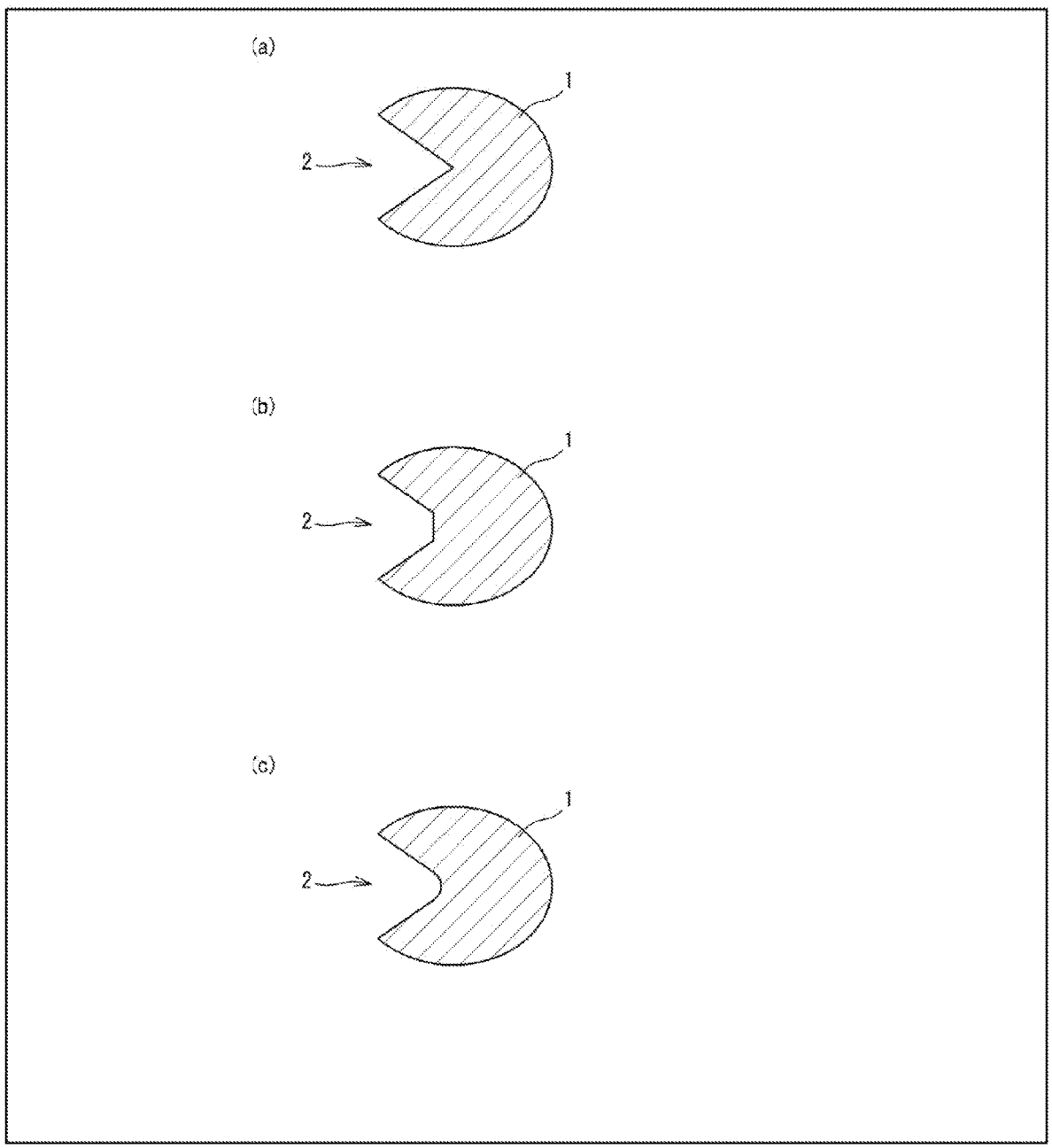
FIG. 4 is a schematic cross-sectional view showing another embodiment of the metal gasket in the X-X section shown in FIG. 1(b).

The metal gasket 1 has a V-shaped circumferential groove 2 on its outer peripheral surface. The bottom of the V-shaped circumferential groove 2 may have an acute angle as shown in FIG. 4(a), a plane as shown in FIG. 4(b) or a circular arc as shown in FIG. 4(c). Among these embodiments of the V-shaped circumferential grooves 2, the acute angle as shown in FIG. 4(a) is preferable from the viewpoint of securing of sealing performance by fastening flanges to each other with a small fastening force. Incidentally, each of FIGS. 4(a) to 4(c) is a schematic cross-sectional view of another embodiment of the metal gasket in the X-X section shown in FIG. 1(b), respectively.

As shown in FIG. 5, a value of a ratio of a depth A of the V-shaped circumferential groove to a length B of the metal gasket in horizontal direction in the cross section of the metal gasket (depth A of the circumferential groove/length B in horizontal direction) is 0.1 or more, preferably 0.2 or more, more preferably 0.3 or more, furthermore preferably 0.4 or more, and still furthermore preferably 0.5 or more, from the viewpoint of securing of sealing performance by fastening flanges to each other with a small fastening force, and 0.95 or less, preferably 0.9 or less, more preferably 0.88 or less, and furthermore preferably 0.86 or less, from the viewpoint of increase in mechanical strength of the metal gasket 1 and securing of sealing performance by fastening flanges to each other with a small fastening force. Incidentally, FIG. 5 is a schematic explanatory drawing showing the depth A of the V-shaped circumferential groove of the metal gasket 1 and the length B in horizontal direction of the metal gasket 1 according to the present invention.

Two end parts 3a, 3b of the circumferential groove 2 exist on the boundary between the V-shaped circumferential groove 2 and the outer peripheral surface of the metal gasket 1 as shown in FIG. 5. The depth A of the V-shaped circumferential groove means a deeper depth from the end parts 3a, 3b of the V-shaped circumferential groove 2.

The length B of the metal gasket 1 in horizontal direction cannot be absolutely determined since the length B differs depending on uses of the metal gasket 1 and the like. Accordingly, it is preferred that the length B is appropriately determined in accordance with the uses of the metal gasket 1 and the like, and the length B is usually 1 to 15 mm or so.

The thickness t of the metal gasket 1 cannot be absolutely determined since the thickness t differs depending on uses of the metal gasket 1 and the like. Accordingly, it is preferred that the thickness t is appropriately determined in accordance with the uses of the metal gasket 1 and the like, and the thickness t is usually 1.5 to 15 mm or so.

The notch angle θ of the V-shaped circumferential groove is 30° or more, preferably 40° or more, and more preferably 45° or more, from the viewpoint of securing of sealing performance by fastening flanges to each other with a small fastening force, and 120° or less, preferably 110° or less, and more preferably 100° or less, from the viewpoint of securing of sealing performance by fastening flanges to each other with a small fastening force.

The metal gasket 1 configured as described above can secure sealing performance by fastening flanges to each other with a small fastening force.

Accordingly, the metal gasket 1 according to the present invention can be suitably used for connecting pipes to each other in, for example, a thermal electric power plant, a nuclear power plant, a steam engine of a steam turbine ship, a petroleum refining line, a petrochemical industry process line, a semiconductor manufacturing line and the like.

EXAMPLES

Next, the metal gasket according to the present invention will be more specifically described based on working examples. However, the present invention is not limited only to those working examples.

Example 1

As a metal gasket, a metal gasket made of aluminum (surface hardness: 22 HV) having a cross-sectional shape shown in FIG. 1 and FIG. 5 was used. More specifically, in the metal gasket 1 shown in FIG. 1 and FIG. 5, the outer diameter L of the metal gasket 1 in the plane shape was 75 mm; the thickness t was 3.5 mm; the depth A of the V-shaped circumferential groove was 3 mm; the length B in horizontal direction was 3.5 mm; the value of the ratio of the depth A of the circumferential groove to the length B in horizontal direction (depth A of the circumferential groove/length B in horizontal direction) was 0.86; and the notch angle of the V-shaped circumferential groove was 75°.

The sealing property of the above-mentioned metal gasket 1 was evaluated in accordance with the following evaluation method of sealing property. As a result, the amount of helium gas leaked from the metal gasket 1 was $1\times10^{-9}$ Pa·m$^3$/s·m. The evaluation results of the above-mentioned sealing property are shown in Table 1.

In addition, compressibility of the metal gasket 1 was evaluated in accordance with the following evaluation method of compressibility. Its results are shown in Table 1. Incidentally, excellent compressibility means that compression load necessary for eliminating a gap between a gasket and a test platen is small.

[Sealing Property]

When sealing property of a gasket was evaluated, a testing device 4 for evaluating sealing property of a gasket as shown in FIG. 6 was used. FIG. 6 is a testing device 4 for evaluating sealing property of a gasket.

First of all, a gasket 5 was provided between a test platen 6a and a test platen 6b in the testing device 4 for evaluating sealing property, and a compression load of 25 kN/m was applied to the gasket 5. Thereafter, helium gas was injected into the evaluation test device 4 from a nozzle 7a of a helium gas cylinder 7, to fill the testing device 4 for evaluating sealing property with helium gas having atmospheric pressure.

Next, the pressure inside the gasket was reduced by means of a helium leak detector 8 until a degree of vacuum inside the gasket was 0.1 Pa. When 5 minutes have passed since the pressure inside the gasket reached the above degree of vacuum, the amount of helium gas leaked from the outside of the gasket into a space inside the gasket was determined.

The sealing property was evaluated in accordance with the following evaluation criteria of sealing property based on the leaked amount of helium gas as determined above.

(Evaluation Criteria)

⊚: Leaked amount of helium gas is $1\times10^{-9}$ Pa·m$^3$/s·m or less.
○: Leaked amount of helium gas is more than $1\times10^{-9}$ Pa·m$^3$/s·m and $1\times10^{-8}$ Pa·m$^3$/s·m or less.
Δ: Leaked amount of helium gas is more than $1\times10^{-8}$ Pa·m$^3$/s·m and $1\times10^{-6}$ Pa·m$^3$/s·m or less.
x: Leaked amount of helium gas is more than $1\times10^{-6}$ Pa·m$^3$/s·m.

[Compressibility]

A testing device 4 for evaluating sealing property of a gasket as shown in FIG. 6 was used. A gasket 5 was provided between a test platen 6a and a test platen 6b, and moved distance of the test platen 6a was determined by means of a dial gauge while the gasket was compressed. A compression ratio was determined on the basis of the equation:

[Compression ratio]=[(Initial height of gasket)−(Height of gasket after compression)]÷[Initial height of gasket]×100.

When the compression ratio reached 17%, a compression load was determined. The compressibility was evaluated in accordance with the following evaluation criteria:

(Evaluation criteria)

⊚: Compression load is less than 50 kN/m.
○: Compression load is 50 kN/m or more and less than 80 kN/m.
Δ: Compressive load is 80 kN/m or more and less than 100 kN/m.
x: Compressive load is 100 kN/m or more.

[Comprehensive Evaluation]

On the basis of the evaluation results of the sealing property of a gasket and the compressibility, the evaluation of ⊚ was counted as 50 points; the evaluation of ○ was counted as 30 points; the evaluation of Δ was counted as 10 points; and the evaluation of x was counted as −10 points. The score of the sealing property and the score of compressibility were summed to obtain total points, and the total points were listed in Table 1. When the evaluation of x was included in the evaluation results of the sealing property of the gasket and the compressibility, "Fail" was listed in the column of the comprehensive evaluation of Table 1. Incidentally, the maximum score of the comprehensive evaluation is 100 points.

Example 2

As a metal gasket, a metal gasket made of aluminum (surface hardness: 22 HV) having a cross-sectional shape shown in FIG. 1 and FIG. 5 was used. More specifically, in the metal gasket 1 shown in FIG. 1 and FIG. 5, the outer diameter L of the metal gasket 1 in the plane shape was 75 mm; the thickness t was 3.5 mm; the depth A of the V-shaped circumferential groove was 1.5 mm; the length B in horizontal direction was 3.5 mm; the value of the ratio of the depth A of the circumferential groove to the length B in horizontal direction (depth A of the circumferential groove/length B in horizontal direction) was 0.43; and the notch angle of the V-shaped circumferential groove was 45°.

The sealing property and compressibility of the above-mentioned metal gasket 1 was evaluated in the same manner as in Example 1. The results are shown in Table 1. Incidentally, when the above-mentioned metal gasket 1 was used, a compression load necessary for imparting a sealing property ($1\times10^{-9}$ Pa·m$^3$/s·m or less) as well as Example 1 was 25 kN/m.

Example 3

As a metal gasket, a metal gasket made of aluminum (surface hardness: 22 HV) having a cross-sectional shape shown in FIG. 1 and FIG. 5 was used. More specifically, in the metal gasket 1 shown in FIG. 1 and FIG. 5, the outer diameter L of the metal gasket 1 in the plane shape was 75 mm; the thickness t was 3.5 mm; the depth A of the V-shaped circumferential groove was 1 mm; the length B in horizontal direction was 3.5 mm, and the value of the ratio of the depth A of the circumferential groove to the length B in horizontal direction (depth A of the circumferential groove/length B in horizontal direction) was 0.29; and the notch angle of the V-shaped circumferential groove was 90°.

The sealing property and compressibility of the above-mentioned metal gasket 1 was evaluated in the same manner as in Example 1. The results are shown in Table 1. Incidentally, when the above-mentioned metal gasket 1 was used, a compression load necessary for imparting a sealing property ($1\times10^{-9}$ Pa·m$^3$/s·m or less) as well as Example 1 was 25 kN/m.

Examples 4 to 31 and Comparative Examples 1 to 9

A metal gasket was produced in the same manner as in Example 1 except that the material of the metal gasket, the outer diameter L of the metal gasket 1 in the plane shape as shown in FIG. 1(*b*); as shown in the metal gasket of FIG. 5, the thickness t, the depth A of the V-shaped circumferential groove and the length B in horizontal direction in its cross section; the value of the ratio of the depth A of the V-shaped circumferential groove to the length B in horizontal direction in its cross section (depth A of the circumferential groove/length B in horizontal direction), which was shown as "depth A/length B" in Table 1; and the notch angle θ of the V-shaped circumferential groove, which was shown as "angle θ" in Table 1 were changed from Example 1 as shown in Table 1. The sealing property and compressibility of the metal gasket were evaluated in the same manner as in Example 1. The results are shown in Table 1.

Incidentally, the material of the metal gasket was described in the column of "material" of Table 1. In Table 1, Al means aluminum [hardness (HV): 22]; and SUS means SUS304 [hardness (HV): 202].

Comparative Example 10

As a conventional gasket, a metal hollow O-ring gasket made of stainless steel (SUS304) (manufactured by VALQUA, Ltd. under the product number of 3640) was used, and the sealing property and compressibility of the gasket were evaluated in the same manner as Example 1. The results are shown in Table 1.

Comparative Example 11

Figure 2:
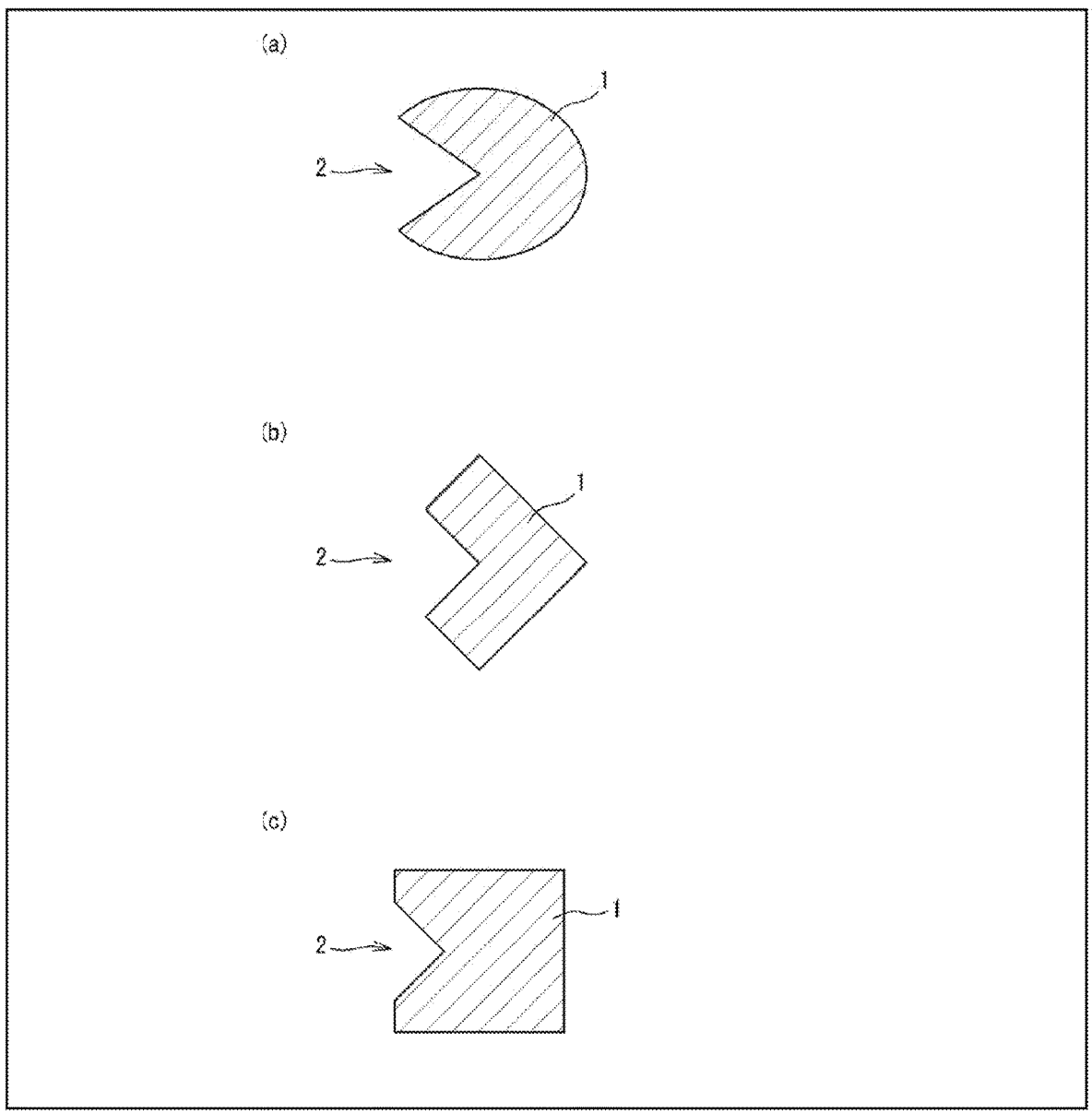
FIG. 2 is a schematic cross-sectional view illustrating one embodiment of the metal gasket in the X-X section shown in FIG. 1(b).

As a conventional metal gasket, a metal gasket made of stainless steel (SUS316L) having a shape of a Japanese character like "⊏" in cross section shown in FIG. 2 of Japanese Patent Unexamined Publication No. 2003-156147 was used. More specifically, the metal gasket shown in FIG. 2, which had an outer diameter D of 75 mm, a width $W_1$ of 4 mm in radius, a width $W_2$ of 3 mm, and a width d of 2 mm between tips 15, 15 was used. The sealing property and compressibility of the gasket were evaluated in the same manner as Example 1. The results are shown in Table 1.

Comparative Example 12

As a conventional ring gasket, a ring gasket made of stainless steel (SUS304) having a V-shaped circumferential groove on its inner peripheral surface as shown in FIG. 1 and FIG. 2 of Japanese Utility Model Publication No. S60-43766 was used. More specifically, a ring gasket shown in FIG. 1 and FIG. 2, in which an outer diameter was 75 mm; a cross-sectional shape had a round shape having a radius of 3 mm; a distance d from the center O to the bottom 23 was 0 mm; and a V-shaped circumferential groove having an opening degree (notch angle) θ of 90° was formed on the inner peripheral surface, was used. The sealing property and compressibility of the above-mentioned ring gasket were evaluated in the same manner as Example 1. The results are shown in Table 1.

TABLE 1

| | | Configuration of gasket | | | | | | Evaluation of gasket | | |
|---|---|---|---|---|---|---|---|---|---|---|
| Ex. and Cop. Ex. | Material | Outer diameter L (mm) | Thickness t (mm) | Depth A (mm) | Length B (mm) | Depth A/ Length B (—) | Angle θ (°) | Sealing property | Compressibility | Comprehension evaluation |
| Ex. 1 | Al | 75 | 3.5 | 3.0 | 3.5 | 0.86 | 73 | ◎ | ◎ | 100 |
| 2 | Al | 75 | 3.5 | 1.5 | 3.5 | 0.43 | 45 | ◎ | ◎ | 100 |
| 3 | Al | 75 | 3.5 | 1.0 | 3.5 | 0.29 | 90 | ◎ | ◎ | 100 |
| 4 | Al | 75 | 3.5 | 3.3 | 3.5 | 0.94 | 73 | ○ | ◎ | 80 |
| 5 | Al | 75 | 3.5 | 3.2 | 3.5 | 0.91 | 74 | ○ | ◎ | 80 |
| 6 | Al | 75 | 3.5 | 3.0 | 3.5 | 0.86 | 75 | ◎ | ◎ | 100 |
| 7 | Al | 75 | 3.5 | 2.7 | 3.5 | 0.77 | 75 | ◎ | ◎ | 100 |
| 8 | Al | 75 | 3.5 | 2.7 | 3.5 | 0.66 | 75 | ◎ | ◎ | 100 |
| 9 | Al | 75 | 3.5 | 2.7 | 3.5 | 0.11 | 75 | ◎ | ○ | 80 |
| 10 | Al | 73 | 3.5 | 2.7 | 3.5 | 0.77 | 115 | ◎ | ○ | 80 |
| 11 | Al | 75 | 3.5 | 2.7 | 3.5 | 0.77 | 90 | ◎ | ◎ | 100 |
| 12 | Al | 75 | 3.5 | 2.7 | 3.5 | 0.77 | 50 | ◎ | ◎ | 100 |
| 13 | Al | 75 | 3.5 | 2.7 | 3.5 | 0.77 | 35 | ○ | ◎ | 80 |
| 14 | Al | 120 | 3.5 | 2.7 | 3.5 | 0.77 | 75 | ◎ | ◎ | 100 |
| 15 | Al | 65 | 3.5 | 2.7 | 3.5 | 0.77 | 75 | ◎ | ◎ | 100 |
| 16 | Al | 75 | 5.0 | 4.0 | 5.0 | 0.80 | 75 | ◎ | ◎ | 100 |
| 17 | Al | 75 | 2.3 | 1.6 | 2.3 | 0.70 | 75 | ◎ | ◎ | 100 |
| 18 | SUS | 75 | 3.5 | 3.3 | 3.5 | 0.94 | 75 | ○ | ◎ | 80 |
| 19 | SUS | 75 | 3.5 | 3.1 | 3.5 | 0.89 | 75 | ◎ | ◎ | 100 |
| 20 | SUS | 75 | 3.5 | 2.8 | 3.5 | 0.80 | 75 | ◎ | ◎ | 100 |
| 21 | SUS | 75 | 3.5 | 2.4 | 3.5 | 0.69 | 75 | ◎ | ◎ | 100 |
| 22 | SUS | 75 | 3.5 | 0.5 | 3.5 | 0.14 | 75 | ◎ | ○ | 80 |
| 23 | SUS | 75 | 3.5 | 2.8 | 3.5 | 0.80 | 105 | ◎ | ○ | 80 |
| 24 | SUS | 75 | 3.5 | 2.8 | 3.5 | 0.80 | 90 | ◎ | ◎ | 100 |
| 25 | SUS | 75 | 3.5 | 2.8 | 3.5 | 0.80 | 50 | ◎ | ◎ | 100 |
| 26 | SUS | 75 | 3.5 | 2.8 | 3.5 | 0.80 | 40 | ○ | ◎ | 80 |
| 27 | SUS | 75 | 3.5 | 2.8 | 3.5 | 0.80 | 30 | △ | ◎ | 60 |
| 28 | SUS | 120 | 3.5 | 2.8 | 3.5 | 0.80 | 75 | ◎ | ◎ | 100 |
| 29 | SUS | 60 | 3.5 | 2.8 | 3.5 | 0.80 | 75 | ◎ | ◎ | 100 |
| 30 | SUS | 120 | 5.0 | 4.1 | 5.0 | 0.82 | 75 | ◎ | ◎ | 100 |
| 31 | SUS | 75 | 2.3 | 1.8 | 2.3 | 0.78 | 75 | ◎ | ◎ | 100 |
| Comp. Ex. 1 | Al | 75 | 3.5 | 0.28 | 3.5 | 0.08 | 75 | ◎ | X | Fail |
| 2 | Al | 75 | 3.5 | 3.5 | 3.5 | 1.00 | 75 | X | ◎ | Fail |

TABLE 1-continued

| | | Configuration of gasket | | | | | | Evaluation of gasket | | |
|---|---|---|---|---|---|---|---|---|---|---|
| Ex. and Cop. Ex. | Material | Outer diameter L (mm) | Thickness t (mm) | Depth A (mm) | Length B (mm) | Depth A/ Length B (—) | Angle θ (°) | Sealing property | Compressibility | Comprehension evaluation |
| 3 | Al | 75 | 3.5 | 2.1 | 3.5 | 0.60 | 25 | ◎ | X | Fail |
| 4 | Al | 75 | 3.5 | 2.1 | 3.5 | 0.60 | 125 | ◎ | X | Fail |
| 5 | Al | 75 | 3.5 | 0.3 | 3.5 | 0.09 | 75 | ◎ | X | Fail |
| 6 | Al | 75 | 3.5 | 2.7 | 3.5 | 0.77 | 125 | ◎ | X | Fail |
| 7 | Al | 75 | 3.5 | 2.7 | 3.5 | 0.77 | 25 | X | ◎ | Fail |
| 8 | SUS | 75 | 3.5 | 3.4 | 3.5 | 0.97 | 75 | X | ◎ | Fail |
| 9 | SUS | 75 | 3.5 | 2.8 | 3.5 | 0.80 | 115 | ◎ | X | Fail |
| 10 | — | — | — | — | — | — | — | ◎ | X | Fail |
| 11 | — | — | — | — | — | — | — | Δ | Δ | 20 |
| 12 | — | — | — | — | — | — | — | Δ | ○ | 40 |

From the results shown in Table 1, it can be seen that sealing performance of the metal gasket obtained in each Example can be secured by fastening the flanges to each other in a small fastening force (compressive load) as compared with the conventional metal hollow O-ring gasket, the conventional metal gasket and the conventional ring gasket.

DESCRIPTION OF SYMBOLS

1: metal gasket
1a: planar section
1b: convex part
1c: recessed part
2: V-shaped circumferential groove
3a: end part of circumferential groove
3b: end part of circumferential groove
4: testing device for evaluating sealing property
5: gasket
6a: test platen
6b: test platen
7: helium gas cylinder
7a: nozzle
8: helium leak detector

The invention claimed is:

1. A metal gasket for connecting pipes to each other, wherein the metal gasket has a circular disk-like shape on a cross section of the metal gasket in a direction perpendicular to a radial direction of the metal gasket and a V-shaped circumferential groove on an outer peripheral surface of the metal gasket, wherein a value of a ratio of a depth A of the circumferential groove to a length B of the metal gasket in horizontal direction in a cross section of the metal gasket (depth A of the circumferential groove/length B in horizontal direction) is 0.2 to 0.9, and wherein a notch angle of the V-shaped circumferential groove is 45° to 90°.

2. The metal gasket according to claim 1, wherein a surface hardness of the metal gasket is 15 to 250 HV.

3. The metal gasket according to claim 1, wherein the metal gasket is formed of a metal selected from the group consisting of aluminum, aluminum alloy, stainless steel, inconel, carbon steel, lead, gold, silver, copper and magnesium alloy.

* * * * *